United States Patent [19]

Gallagher

[11] 4,261,708

[45] Apr. 14, 1981

[54] APPARATUS AND METHOD FOR SEPARATING IMPURITIES FROM GEOTHERMAL STEAM AND THE LIKE

[75] Inventor: Arthur P. Gallagher, Dallas, Tex.

[73] Assignee: Vibration and Noise Engineering Corporation, Dallas, Tex.

[21] Appl. No.: 23,395

[22] Filed: Mar. 23, 1979

[51] Int. Cl.³ .............................................. B01D 45/12
[52] U.S. Cl. ........................................... 55/51; 55/52;
 55/340; 55/345; 55/457; 55/468; 60/641
[58] Field of Search ...................... 55/52, 89, 318, 325, 55/326, 338, 340, 345, 441, 457, 468; 60/641; 166/267; 209/134, 135, 156, 143, 144

[56] References Cited

U.S. PATENT DOCUMENTS

| | | | |
|---|---|---|---|
| 2,393,112 | 1/1946 | Lincoln | 55/340 |
| 2,646,854 | 7/1953 | Walker | 55/457 X |
| 2,765,045 | 10/1956 | Meyers | 55/51 X |
| 3,793,812 | 2/1974 | Willis | 55/338 |
| 3,964,884 | 6/1976 | Judith et al. | 55/340 X |

Primary Examiner—Robert H. Spitzer
Attorney, Agent, or Firm—Craig & Antonelli

[57] ABSTRACT

A horizontal separator for separating impurities from geothermal steam or the like is provided which includes a pair of drip or drain legs for accommodating the separated fluid portion containing the impurities. To maintain the temperature of the drain legs sufficiently high to prevent hardening of the impurities on the walls thereof, a portion of the steam continuously flows into the drain leg with the separated impurities. In order to minimize venting of the steam supplied to the drain legs directly to atmosphere and consequent environmental problems, and also to improve the efficiency of operation of the separator, recycle lines are provided between the drain legs and the inlet to the separator for recycling a portion of the steam. At the inlet, this recycled steam is drawn into the separator by way of an ejector-type recycle pump. In preferred embodiments, two drip legs are provided for the horizontal separator and the recycle flow back into the recycle pump is equalized for the two legs using control valves in the recycle lines. Preferred embodiments also provide for reversal of the drip leg steam flow in the drip legs before it is recycled so as to minimize the impurities in the recycled steam.

23 Claims, 6 Drawing Figures

APPARATUS AND METHOD FOR SEPARATING IMPURITIES FROM GEOTHERMAL STEAM AND THE LIKE

BACKGROUND AND SUMMARY OF THE INVENTION

The present invention relates to steam separators and the like, such as are used in certain geothermal steam energy tapping applications. Horizontal separators for separating impurities from high pressure steam sources have been previously contemplated. Such horizontal separators include drain legs for accumulation of the impurities. In the known constructions, a portion of the steam along with the impurities is continuously supplied to the drain leg so as to keep the drain legs hot so that the material accumulated does not harden so hard that it cannot later be blown out at intermittent intervals. This steam supplied to the drain legs has previously been vented directly to the atmosphere, in order to assure the continuous flow into the drain legs which also aids in the continuous operational flow of the steam through the separator.

A difficulty with the previously contemplated arrangements mentioned above is that the steam supplied to the drain legs and vented directly to atmosphere has some adverse environmental impacts due to the impurities, heat, moisture, and noise associated therewith. In certain installations, the geothermal steam contains boron compounds and/or $H_2S$ gas, which when vented to the surrounding atmosphere causes a bad odor and also precipitates out into unsightly deposits. Accordingly, it would be advantageous from an environmental standpoint to provide some method to control such vented steam, such as providing a system for collecting, recompressing, and pumping into the ground such vented steam. However such a system would be particularly expensive and require a lot of piping and other hardware. Furthermore, both the provisions for venting steam, and any provisions one may provide for preventing the vented steam from passing directly to the atmosphere, necessarily impair the overall throughput efficiency of the system.

Other separators have been contemplated which include a spinner section or static vane structure section which imparts centrifugal motion to the fluid with the outwardly centrifuged portion of the flow, containing the most impurities, being recycled back into the spinner section. This recycled flow travels adjacent a sump or drain leg to accommodate gravity separation of the impurities and liquids, prior to being reintroduced back into the spinner section. Since a large part, on the order of 10% total flow, is recycled the throughflow efficiency of such separators is limited. In such a system, if the steam flow is not intentionally cycled into the drip leg, the temperature of the drip leg may not be reliably maintained by the steam so as to prevent hardening of the solid impurities. On the other hand, the liquid or water which would fall into the drip leg may partially accommodate the maintenance of the temperature of the solids. However, this water would create the need for some type of drain or other system to remove the liquid.

The present invention contemplates an arrangement which will overcome the drawbacks of the above-noted prior art arrangements at a minimum of constructional expenditures. According to particularly preferred embodiments of the present invention, it is proposed to provide a separator with steam continuously supplied to the drain or drip legs to maintain the temperature thereof and then to have a low pressure region at the upstream end of the separator to accommodate recycling of the steam from the drain legs back into the separator.

According to particularly preferred embodiments of the invention, the separator is provided with an ejector type of pump. This type of combination of separator and ejector pump utilizes the energy in the incoming steam supply to facilitate the recycle pumping action of the steam from the drain leg connections. It is contemplated that recycling of $\frac{1}{2}\%$ to $1\frac{1}{2}\%$ of the total steam flow will accommodate the heating of the drip legs and optimize the total efficiency of the separator.

Particularly preferred embodiments utilize separators having a first so-called "knock-out" section and a downstream spinner or centrifuging section. The knock-out section serves to deflect the large solid particles coming in from the raw supply of geothermal steam, and prevents these from being ingested into the system spinner section to plug the same up or the like. A separate drip leg is then provided for each of the knock-out section and the spinner section to collect the solids separated. In these systems having multiple drain legs, the present invention contemplates controlling the recycle conduits so that they have substantially equal flow rates back into the ejector pump.

Preferred embodiments of the present invention also contemplate inclusion of flow reversing mechanisms, such as conical inlet members, in the drain legs themselves so as to assure a reversal of the steam flow within the drain leg with consequent improved removal of impurities from the steam before it is recycled back into the separator inlet. The reversal of the drain leg steam flow portion is assured by placing the connections for the conduits leading back to the inlet at a position disposed vertically above the bottom of the conical inlet openings of the conical inserts in the drain legs.

The apparatus and method of the preferred embodiments of the present invention exhibit many advantages including:

(i) venting of steam to atmosphere is avoided while obtaining the use of the hot steam to heat the drain legs and prevent hardening of the solid impurities collecting in the drain legs;

(ii) the overall efficiency of the system is optimized by controlling the amount of drain legs steam to be recycled to optimize the needs of the systems;

(iii) the maintenance required is minimized since only static structure is required, once the system has been set up, an advantage that is particularly important in practical applications where geothermal wells are at remote locations that can't be economically continuously monitored;

(iv) the manufacturing expenditures are minimized due to the simplified constructions;

(v) the system can be retrofitted to many existing systems which now continuously vent the drain leg steam to atmosphere;

(vi) in embodiments with multiple drain legs, the flow back into the ejector pump at the separator inlet is balanced and symmetrically supplied about the circumference of the inlet so that the ejector pump operates efficiently and reliably.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
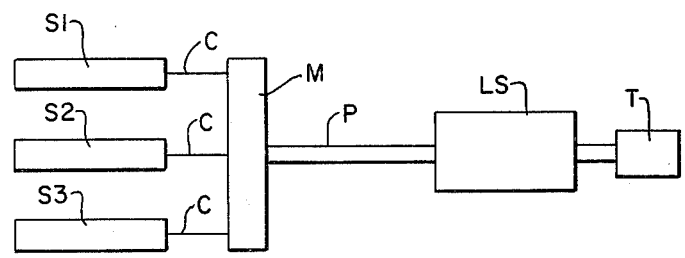
FIG. 1 is a schematic diagram of a geothermal well system of the type within which the preferred embodiments of the invention can be utilized.

FIG. 1 schematically depicts the arrangement of a plurality of individual small separators S1, S2, S3, arranged at respective individual geothermal wells. These small separators S1 are then connected via conduits C to a common manifold M. This manifold M is then in turn connected by large piping P to a large separator LS, wherein final separation and cleaning of the steam is accomplished before it is then passed into a turbine T for producing electrical energy. In practice, the individual wells and separators may be hundreds of feet or hundreds of yards apart, with the piping P, coming from a common manifold to the large separator and turbine station, being up to several miles long. In this environment, it should be understood that the desirability of having maintenance free static structure for conducting the separator operations at the individual wells, is important, especially considering the relatively remote areas wherein these geothermal sources are obtainable. The present invention is primarily concerned at improving the separators schematically depicted at S1, S2, S3 in this FIG. 1 illustration, it being these separators which are subjected to the large concentrations of impurities and attendant separation problems related thereto.

Figure 2:
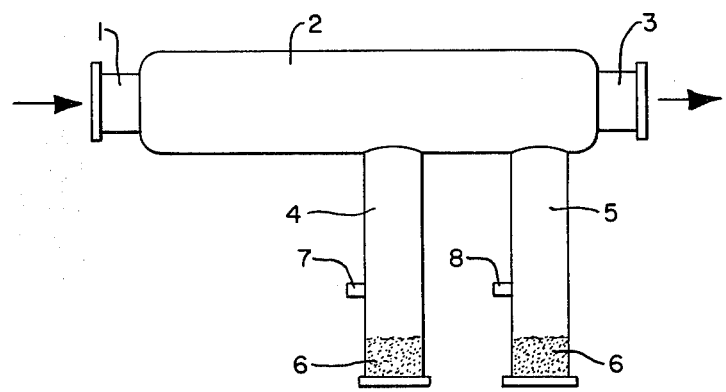
FIG. 2 is a side schematic view of a first prior art steam separator arrangement.

FIG. 2 very generally schematically depicts a prior art separator arrangement which includes an inlet opening 1 leading to a separator 2, and then to an outlet 3. The impurities separated in the separator 2 are collected in drip legs 4 and 5, serially disposed along the length of the separator. The separated solids schematically depicted at 6 collect at the bottom of these drip or drain legs 4 and 5. In order to maintain the temperature of the drip legs and prevent solidification of the solid impurities in the drip legs 4 and 5, continuous venting of a portion of the steam flow to atmosphere via vents 7 and 8 is provided. These vents 7 and 8 facilitate not only the heating of the drip legs 4 and 5, they also aid in the efficient throughflow of the steam to the separator 2. This continuous venting of the steam via vents 7 and 8 leads to environmental problems, and also results in the loss of the heat and pressure energy of such vented steam.

Figure 3:
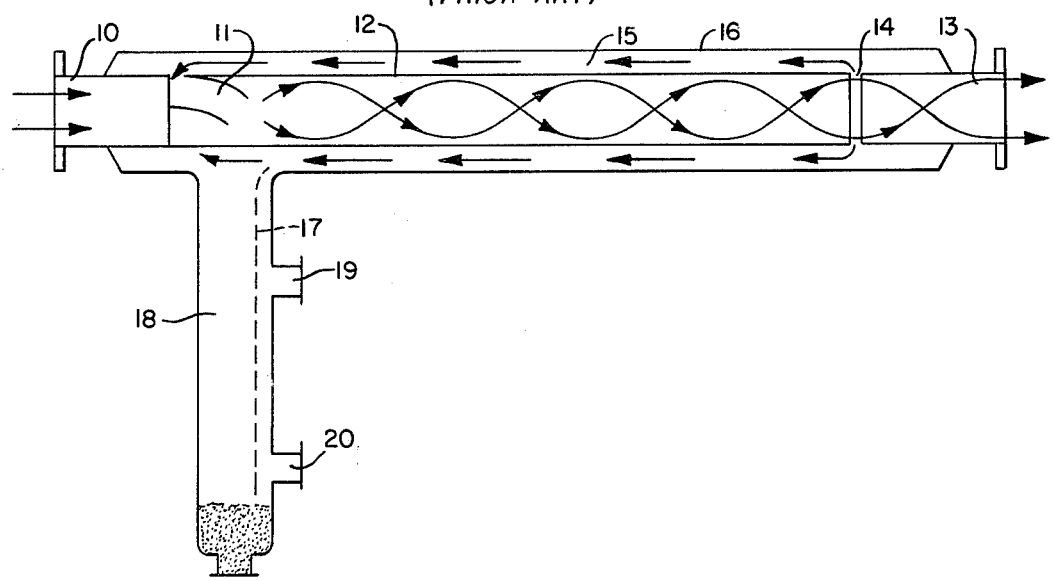
FIG. 3 is a side schematic view of a second prior art steam separator arrangement.

FIG. 3 schematically depicts another prior art arrangement, wherein steam is supplied via inlet 10 where it then enters a spinner section 11 to impart rotational spinning motion thereto, as depicted by the arrows extending along the inner pipe 12. Adjacent the outlet 13, there is a gap 14 which permits the egress of the solids and some liquids separated out by the centrifugal action which are then passed via annular space 15 between pipe 12 and outer pipe 16, back into the inlet of the spinner section 11. A schematically depicted by dots 17, the solids and some fluid separate by gravity out of this return flow in annular duct 15, and fall into drip or drain leg 18. Openings 19 and 20 are provided in the drain leg 18 for cleaning thereof. In this prior art arrangement, approximately 10% of the total steam flow is recycled back into the initial stage of the spinner section, the spinner section itself creating the suction flow to draw back in this gas.

Figure 4:
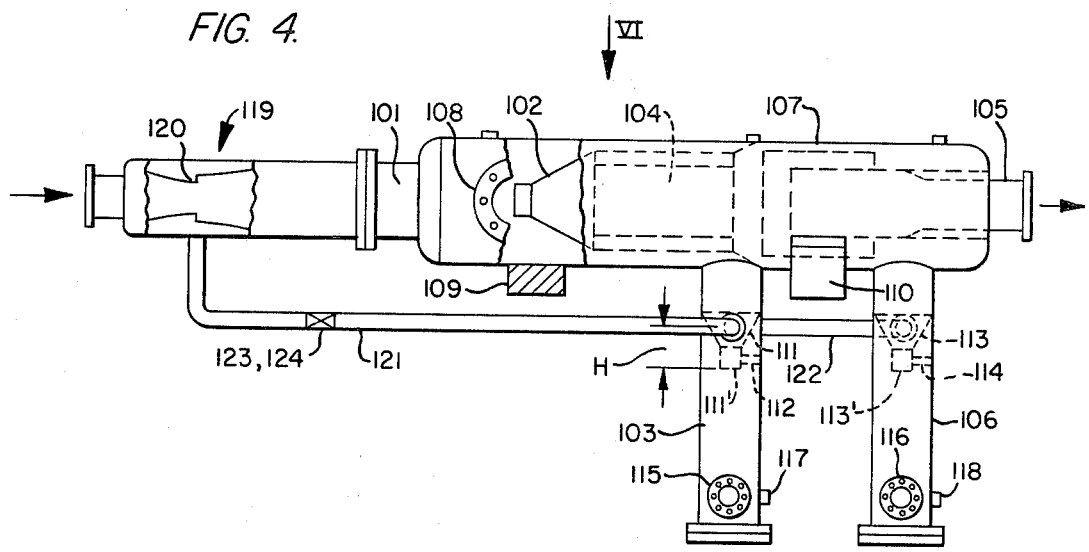
FIG. 4 is a side schematic view showing a horizontal steam separator with a drain leg flow recycle system, constructed in accordance with a preferred embodiment of the present invention.
Figure 5:
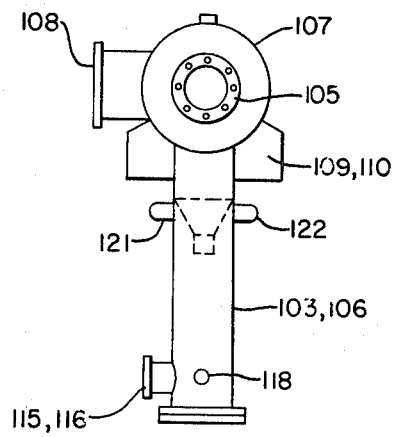
FIG. 5 is an end view taken from the right of the separator shown in FIG. 4.

The present invention will now be described with reference to the illustration thereof at FIGS. 4 to 6 of the drawings. In these drawing Figures, like reference numerals will be utilized to depict like parts. Since certain internal details of the horizontal separator itself are of conventional construction and readily known to those skilled in the art, the details thereof have been dispensed with herein so as not to obscure what applicant considers as the present invention.

Referring to the drawings, the separator includes a separator inlet section 101 which opens into a first stage so-called "knock-out" section having a conical member 102 which deflects the incoming solid particles in the steam flow, radially outwardly, wherein they are then passed into a first drip leg 103. Immediately downstream of this knock-out section 102, a spinner section 104 is provided, which includes static vanes which impart a spinning motion to the fluid flow, with centrifugal separation of the heavier impurities in the outward direction, while permitting the cleaner central flow to continue onward to the outlet section 105. The impurities removed in this spinner section 104 are collected in drip leg 106. The knock-out section and spinner section are contained in a tubular housing 107, which tubular housing includes access openings 108, as well as other drain type openings to accommodate access to and cleaning and repair of the internal parts thereof. The separator housing 107 is supported on supports 109, 110. In use, the separator is maintained in the horizontal position, with the drain legs 103 and 106 extending vertically downwardly therefrom. In the FIG. 4 illustration, the housing 107 is broken away so as to show the deflecting cone 102.

The drip leg 103 includes a conical insert 111 for assuring the divergence of the flow of materials in the downward direction to the outlet facing downwardly at 111'. A support 112 is provided for holding this insert 111 in position in the drip leg. In a like manner, drip leg 106 is provided with a conical guide member insert 113, having a downwardly facing opening 113'. Insert 113 is held in position by support member 114. These inserts 111 and 113 are configured so as to assure that all flow of impurities, gases, and liquids, must pass through the openings 111' and 113', respectively. The drip legs are also provided with blow-down openings 115, 116, as well as drain plugs openings 117, 118, whereby the drain legs can be drained, and periodically blowndown, perhaps on a daily basis for the blow-down operation.

Upstream of the inlet section 101, an ejector pump 119 is provided, which creates a low pressure suction zone 120 by means of the throughflow of the steam from the geothermal source. This ejector pump is provided so as to accommodate recycling of the flow of steam from the drip legs 103 and 106 back into the separator, by way of conduits 121, 122. The openings of the conduits 121 and 122 into the respective drip legs 103, 106 is at a height H above the openings 111' and 113', thereby assuring a reversal in the direction of flow of the steam recycled back through these conduits 121, 122, within the drain legs themselves. This assured reversal of the flow in the drain legs provides for a separation by gravity of solids contained in the gas flow, prior to its being recycled back into the ejector pump 119. This arrangement of the openings to the recycled conduits, and the conical guide inserts at the drain legs, not only assures a reversal of the flow and further cleaning thereof before recycling, it also assures that the recycled steam flow does sufficiently impact the interior of the drain legs 103 and 106 so as to maintain their temperature sufficiently to prevent hardening of the solid impurities in intermittent blow-down operations.

Figure 6:
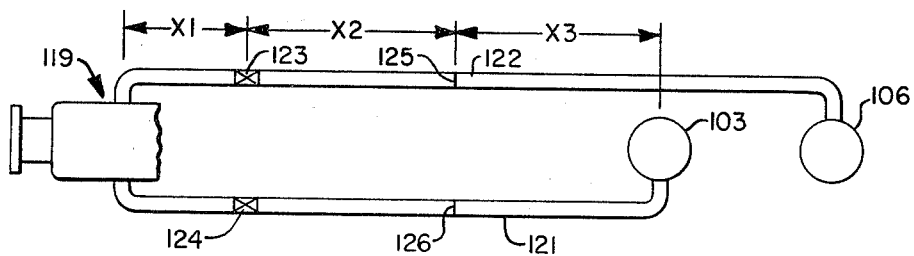
FIG. 6 is a schematic plan view, taken in the direction of arrow VI of FIG. 4 and with the separator structure removed, showing the drain leg recycle system constructed in accordance with a preferred embodiment of the present invention.

FIG. 6 schematically depicts the control flow arrangement for the recycled steam from the drain legs back into the ejector pump 119. Conduit 122 includes a control valve 123 which can control the amount of fluid or gases passed therethrough. In a like manner, conduit 121 includes a control valve 124, arranged the same distance $X_1$ from the opening of the respective conduits 121 and 122 into the pump 119. The conduits 121 and 122 open into the low pressure space 120 of the pump 119 at symmetrically disposed diametrically opposite points so as to minimize disruption of the flow into the pump and into the separator system. To accommodate the balancing of the flow in the two lines 121 and 122, fittings 125 and 126 are provided for accommodating manometer probes or other flow measuring devices. The distance $X_2$ between the valves 123, 124 and the respective flow checking fittings 125, 126 is preferably equal to the distance $X_3$ between these fittings and the closest drain leg 103, thereby ensuring a balanced reliable measurement of the flow at an equivalent point in the two conduits 121, 122, in spite of their different lengths due to the location of the drain legs 103, 106. Although preferred embodiments are contemplated wherein continuous monitoring of the flow through each of the conduits 121 and 122 could be accomplished via the fittings 125, 126, the most preferred embodiments of the invention contemplate checking this flow only periodically and having relatively long term fixed setting of the valves 123, 124. In this way, the total cost is substantially reduced, since one need only check the flow conditions and set the control valves one time, to fit a given geothermal well supply, especially since the flow from the supply remains relatively constant. It is further contemplated according to the present invention to control the flow through the lines 121 and 122 so that between $\frac{1}{2}\%$ and $1\frac{1}{2}\%$ of the total throughput of the separator is recycled through these lines, thereby optimizing the efficiency of the system, and also obtaining the advantages of the recycled steam heating of the drip legs.

By utilizing an overall combination with an upstream ejector pump 119, and knock-out section 102 as the first separator stage, the system can be used with geothermal steam sources having a large number of heavy large solid particles. Since these particles will come into the system at very high speed under high pressure, it is important that fairly wide open throughflow openings are provided so as to prevent damage and clogging of the system. The knock-out cone 102 is constructed so as to take the very large forces expected from rocks and the like that have to be deflected at that stage, whereby the second spinner stage 104 is then relatively free of these large particles and will not be damaged or clogged up thereby.

In use on known geothermal steam sources, the inlet flow is saturated steam at about 352° F. and at a pressure of about 130 psi (pounds per square inch). With separators of the type contemplated by the present invention, the outlet of the separator will be at a pressure of about 120 psi at about 344° with saturated steam. The ejector pump should create about 2 psi pressure drop at the space 120 for drawing in the steam from the drip legs. In a particular practical embodiment of the invention, the tubular shelf for the separator 107 has an outside dimension of 26 inches diameter, the drip legs have an outside diameter of $12\frac{3}{4}$ inches, and the conduits 121 and 122 have a 2 inch diameter and are then connected by way of a reducer to the inlet to the ejector pump 119.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. Separator apparatus for separating solid impurities from a supply of geothermal steam or the like, comprising:

an inlet for the geothermal steam, separator means downstream of said inlet including means for continuously separating solid impurities from said steam with throughflow of cleaned steam, an outlet downstream of said separator means for accommodating continuous outflow of said cleaned steam, drain leg means communicating said solid impurities away from said separator means and including impurity storage space to accommodate storage of the solid impurities, said drain leg means being disposed to also accept a drain leg portion of the steam flow thereinto to maintain the temperature of the drain leg means to minimize hardening of said solid impurities in the drain leg means, and recycle means communicating directly with the drain leg means for continuously recycling the drain leg portion of the steam flow back into said inlet.

2. Apparatus according to claim 1, wherein said drain leg means includes two drain legs spaced from one another along the length of the separator means.

3. Apparatus according to claim 2, wherein said recycle means includes separate drain leg conduit means leading from each of said drain legs to said inlet, and wherein control valve means are provided in at least one of said drain leg conduit means for controlling the flow therethrough so that the flow is substantially equal through both of said drain leg conduit means.

4. Apparatus according to claim 3, wherein an ejector type recycle pump is disposed at said inlet for continuously creating a low pressure area to urge the flow of drain leg steam through said recycle means, said recycle pump being actuted by the flow of geothermal steam through said inlet.

5. Apparatus according to claim 4, wherein said drain leg conduit means open into said pump at symmetrically disposed diametrically opposite sides of said inlet.

6. Apparatus according to claim 1, wherein an ejector type recycle pump is disposed at said inlet for continuously creating a low pressure area to urge the flow of drain leg steam through said recycle means, said recycle pump being actuated by the flow of geothermal steam through said inlet.

7. Apparatus according to claims 1 or 6 or 4, wherein said recycle means is configured to recycle between $\frac{1}{2}\%$ and $1\frac{1}{2}\%$ of the total steam flow through said separator means.

8. Apparatus according to claim 1, wherein said drain leg means includes steam-flow reversal means for reversing the flow of said drain leg portion of the steam in the drain leg means upstream of where said drain leg portion passes into said recycle means, whereby removal of impurities from said drain leg portion of the steam in said drain leg means is facilitated.

9. Apparatus according to claim 8, wherein said steam-flow reversal means includes conical inlet means which narrow in the downstream direction of the drain legs, said conical inlet means being disposed with the outlet thereof located upstream of and below an opening of said recycle means into said drain leg means, whereby the impurities fall to the bottom of the drain leg means under force of gravity and are separated from the steam which is then recycled.

10. Apparatus according to claims 2, or 6 or 4, wherein steam-flow reversal means are provided in each drain leg for reversing the direction of flow of said drain leg portion of the steam in the drain leg upstream of the opening of said recycle means into said respective drain leg, facilitating removal of impurities from said drain leg portion of the steam prior to recycling thereof.

11. Apparatus according to claim 1, wherein said separator means includes a knock-out-type first stage which exhibits a centrally disposed conical abutment for radially deflecting solid particles contained in the flow of steam through said inlet, the solid particles deflected in this first stage being guided to a first drain leg of the drain leg means.

12. Apparatus according to claim 11, wherein said separator means includes a spinner-type second stage which includes static vane structure configured to impart spin to the steam flow and to separate out impurities by centrifugal action, the impurities separated out in this spinner type second stage being guided to a second drain leg of the drain leg means, said spinner type second stage being located downstream of said knock-out type first stage.

13. Apparatus according to claim 11, wherein said first and second stages are contained in a common tubular casing which connects the inlet and outlet.

14. Apparatus according to claim 1, wherein blow-down means are provided for intermittently blowing out the solid impurities accumulated in the drain leg means.

15. A method of separating solid impurities from a supply of geothermal steam or the like, comprising:
supplying geothermal steam to a separator inlet,
continuously separating solid impurities from the steam in a separator disposed downstream of the inlet with continuous outflow of cleaned steam,
communicating said impurities and a drain leg portion of said steam to drain leg means opening into said separator, said drain leg portion of said steam serving to maintain the temperature of the drain leg means to minimize hardening of solid impurities in the drain leg means,
and recycling said drain leg portion of said steam continuously back into said inlet.

16. A method according to claim 15, wherein said recycling includes recycling between $\frac{1}{2}\%$ and $1\frac{1}{2}\%$ of the total flow through said separator.

17. A method according to claim 16, wherein said recycling includes ejection pumping of said drain leg portion of the steam utilizing the steam flow through said inlet to create the pumping suction for said drain leg portion of the steam.

18. A method according to claim 15, wherein said recycling includes ejection pumping of said drain leg portion utilizing the steam flow through said inlet to create the pumping suction for said drain leg portion of the stream.

19. A method according to claim 18, wherein said recycling includes passing said drain leg portion of the steam through a plurality of conduits communicating with respective separate drain legs of said drain leg means, and wherein the flow cross section of said conduits is controlled to assure equal flow through each of said conduits.

20. A method according to claim 19, wherein said conduits are configured to open symmetrically into an ejection pump arranged at the inlet.

21. A method according to claim 15, further comprising reversing the flow of said drain leg portion of the steam in the drain leg means prior to recycling same to said inlet, whereby removal of impurities from said drain leg portion of the steam in said drain leg means is facilitated.

22. A method according to claim 21, wherein said reversing the flow includes passing the drain leg portion of the steam through a downwardly narrowing conical guide member in respective drain legs of said drain leg means, and wherein said recycling includes passing the drain leg portion of the steam through an opening in said respective drain legs disposed above the bottom of the conical guide member.

23. A method according to claim 15, further comprising periodic blowing out of the solid impurities accumulated in the drain leg means.

* * * * *